Patented May 4, 1948

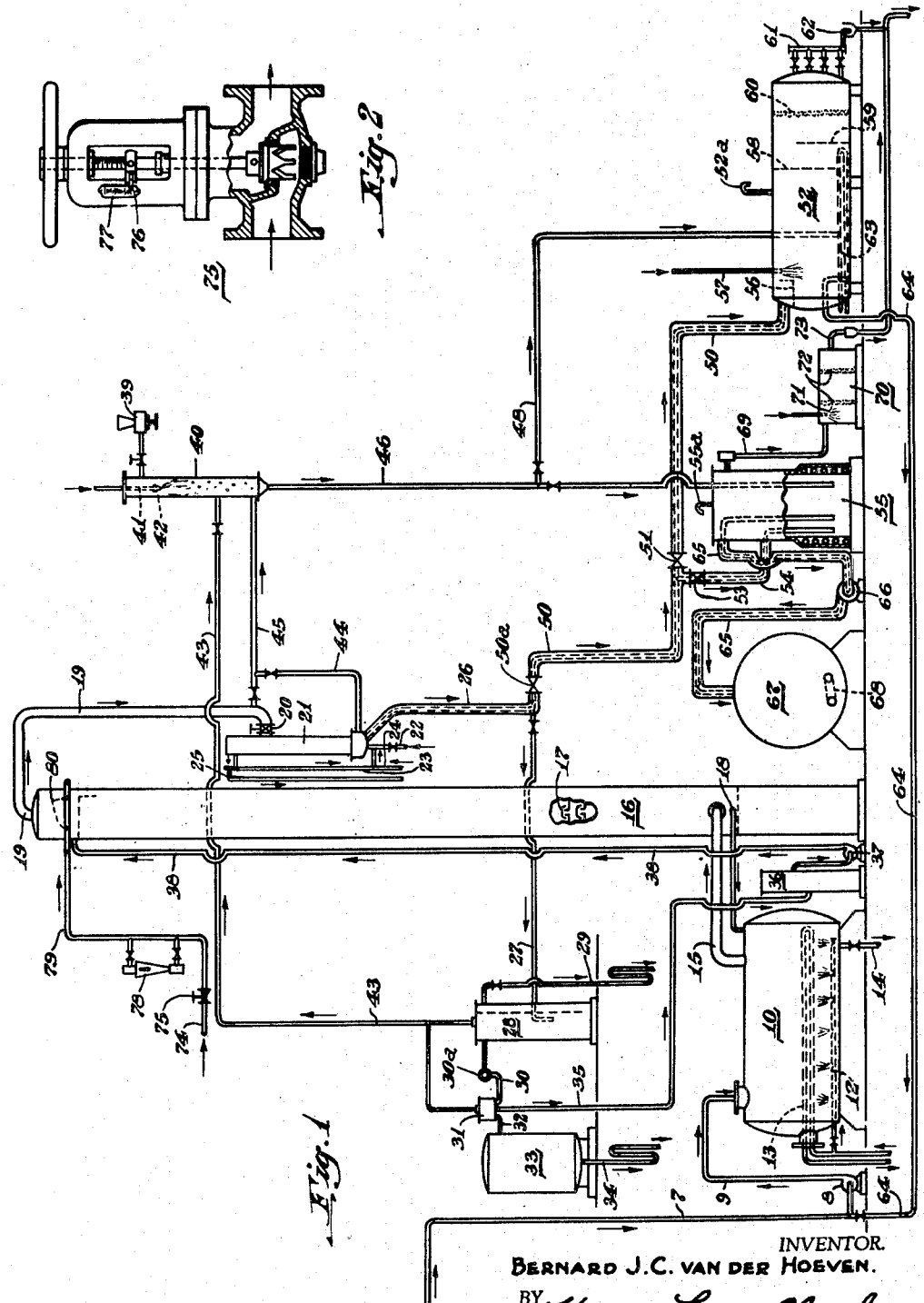

2,440,707

UNITED STATES PATENT OFFICE 2,440,707

REFINING OF NAPHTHALENE BY DISTILLATION

Bernard J. C. van der Hoeven, Pittsburgh, Pa., assignor, by mesne assignments, to Koppers Company, Inc., a corporation of Delaware Application March 30, 1942, Serial No. 436,799

11 Claims. (Cl. 202—40)

The present invention relates in general to the refining of distillable organic substances and more especially of naphthalene and like organic compounds that are normally solid at atmospheric temperatures, and is more particularly concerned with improvements in method and means for refinably distilling crudes of the stated class of compounds having their sources in gases produced by the carbonization of fuel.

In the early art of refining naphthalene from its crudes, it was usual to employ a simple distillation procedure that was commonly performed in direct-fired batch-stills and was usually carried out without any special control or even consideration of either refluxing or dephlegmation of the vapors of distillation. The resultant naphthalene distillate-product customarily required further treatment by such means as recrystallization, centrifugalization, and hot-pressing to arrive at a naphthalene product having a melting point of even about 78° C., and such product required acid washing, and an additional distillation step to produce naphthalene of a high degree of purity. In the interest of simplifying the procedure for obtaining pure naphthalene from its crudes there have been more recently introduced such improvements as indirect-steam heating of the still, distillation under fairly high degrees of vacuum, and returning of a portion of the products of distillation to the fractionating zone for purposes of maintaining therein preferred ratios of liquid reflux to distilling vapors. All of these devices have advanced the efficiency of naphthalene refining but have brought with them certain vexatious problems that consistently recur to interrupt the smooth course of such distillations; for example, despite elaborate precautions for their prevention, apparatus for creating conditions of vacuum become stopped with crystalline product, the lines and associated pumping apparatus for returning molten naphthalene to the fractionating column, for use as refluxing material, are subject to leaks and to stoppages by freezing of the same therein, and there is always present the hazard of fire such practice creates along with divers other complications and difficulties.

An object of the present invention is to provide simple and effective improvements in method and means for obtaining refined naphthalene, and the like materials, from crudes containing the same.

A further object of invention is the provision of improved method and means for regulably controlling liquid-to-vapor reflux ratios in the fractional distillation of such organic substances as naphthalene and the like.

A further object of invention is the provision of improvements whereby it becomes practical to enjoy the well known advantages of vacuum in the distillation of naphthalene and of the like solids having a tendency to sublime.

A further object of invention is the provision of simple and effective method and means whereby naphthalene having a melting point of at least substantially 78° C. can be directly obtained by means of a single distillation step from crudes thereof having their origin in the carbonization of fuels.

The invention has for further objects such other improvements and such other operative advantages or results as may be found to obtain in the processes or apparatus hereinafter described or claimed.

According to the present invention naphthalene crudes, and the like, such for example, as are obtained as condensates from coal-carbonization gases or as products derived otherwise from fuels, are fractionally distilled for the recovery therefrom of refined naphthalene by means including introducing, in liquid form and directly into the hot, distilling naphthalene vapors of the fractionating zone preferably at or adjacent the upper part thereof, a liquid having substantial immiscibility with said naphthalene and preferably also a lower boiling point than naphthalene, for example water, the said immiscible liquid being introduced in such regulable quantities as are adapted to be promptly evaporated and thus to effect that condensation of vapors rising through the fractionation zone which establishes, below the level of introduction of said liquid, a reflux ratio between rising vapors and descending condensate that provides the conditions necessary to effect the preferred removal of impurities from those of the distilling naphthalene vapors, or the like, which are allowed to issue from said fractionating zone.

Briefly stated then, in contrast to prior practice, wherein the preferred condensate-to-vapor ratios employed in distillation columns for fractionating crudes of naphthalene, or the like, were regulably controlled by recycling thereinto products that had been previously distilled from said crudes and thereafter condensed outside the fractionating zone, the present improvement provides for regulably controlling such condensate-to-vapor ratios by effecting condensation in situ in the fractionating columns themselves of the requisite amounts of the distilling vapors, this being brought about by introduction directly into the column of an extraneous liquid that is immiscible with and has preferably a lower boiling point than the distilling naphthalene, or the like. By means of this novel process feature, heat of vaporization of naphthalene vapors is given up to the extraneous liquid thereby vaporizing the same and condensing naphthalene which, thereafter, flows downwardly through the fractionating column as reflux material, whereas the vapors of the extraneous liquid pass out of said column in admixture with collected refined naphthalene distillate product. Upon subsequent condensation of this admixture outside the fractionating column and by virtue of its immiscibility with the naphthalene, the extraneous liquid can be separated by such well-known physical means as gravitation, centrifugalization, filtration, or the like, from the naphthalene fraction thereby leaving it in refined form and the recovered extraneous liquid can be thereafter recycled.

The present invention also provides, novel features of condensation for the admixture of vapors of naphthalene and extraneous liquid that issue from the fractionating apparatus, whereby advantageously the naphthalene can be simply separated, either in liquid or solid phase, from the employed extraneous liquid, and whereby such features of apparatus as condenser and vacuum means can be maintained operatively free of accumulations of solid naphthalene, and the like, that have heretofore interfered with smooth continuous performance of distillation and condenser apparatus for refining such materials. These novel features will be more fully discussed in the following description of the present invention and its advantages, wherefrom the beneficial elimination of costly dephlegmator apparatus and apparatus adapted to recirculate previously distilled molten solids to the fractionating columns will be more easily appreciated.

In the accompanying drawings forming a part of this specification and showing for purposes of exemplification a preferred apparatus and method in which the invention may be embodied and practiced but without limiting the claimed invention specifically to such illustrative instance or instances:

Fig. 1 is a diagrammatic elevational view, parts being in section and parts broken away, of apparatus for distilling naphthalene at either normal or reduced pressures in accordance with features of the present invention; and Fig. 2 shows valve means susceptible of sufficiently refined regulation of liquid flow to permit its employment for adjusting flow of reflux-producing liquid, into fractionating columns, according to the present improvement.

Those naphthalene crudes that are susceptible to treatment to yield refined naphthalene according to the present invention have a variety of characteristics: they may contain liquid fractions that boil at temperatures below that of naphthalene itself or material that boils at temperatures somewhat higher than that of naphthalene; they may also contain proportions of both the higher and lower boiling materials.

Referring now to the drawings: the naphthalene crudes, introduced into the illustrated apparatus, are charged from valved supply-line 7 by pump 8 through line 9 to batch-still kettle 10 that is supplied with a direct-steam distributor pipe 12 and an indirect-steam coil 13, and also with an outlet drain line 14 for discharging the still residues. The distilled vapors effluent to the still kettle flow through still-vapor line 15 into a fractionating column 16 wherein there is disposed a plurality of bubble cap trays 17. Higher boiling material condensing in the column is returned from the fractionating tower to the still kettle through condensate return pipe 18. Vapors from the said still kettle 10 ascend through the said bubble caps in the fractionating column into contact with liquid condensate previously collected on said trays. Fractionated vapors leave column 16 through vapor line 19 and its valve 20, and enter water-tube condenser 21 that is equipped for indirectly cooling the vapors to a preferred temperature with water that can be heated, by the addition thereto of steam from injector pipe 22, and can also be circulated, by so-injected steam, through the inside of the cooling tubes in the said condenser 21 and thence be returned to the cooling medium inlet through water pipe 23 in a counterclockwise direction, as indicated by the arrows in the drawing. This water-circulating equipment for the condenser is further supplied with water inlet 24 and an overflow pipe 25. By governing, with such injector apparatus, the relative rates of steam and water flowed into and through the said condenser, the condensate issuing therefrom can be cooled to any preferred temperature; for example, naphthalene and reflux-producing water, effluent to distillation column 16, can both be either flowed from the condenser in admixture in liquid phase, or the naphthalene can be even cooled to a somewhat crystalline form, the aqueous portion in such instance serving to flush the naphthalene crystals from the condenser apparatus and maintain it free of crystal accumulations.

Condensate formed in condenser 20 flows therefrom through insulated pipe 26, and, when the said condensate consists of forerunning materials which are normally liquid and have their boiling points below that of the refined naphthalene product, the condensate is directed through valve-controlled pipe 27 to forerunning-distillates separator 28. This separator is supplied with decanting means whereby the aqueous fraction of the condensate is permitted to settle from the supernatant forerunning materials and thereafter to be withdrawn through barometrically sealed decanting pipe 29 to a liquid seal in a sump (not shown). The supernatant layer is decanted through pipe 30 wherein there is disposed sight-flow 30a for visually assuring that there is no water present in the withdrawn forerunnings material that is thereafter proportionately directed by means of proportioning means 31 either through pipe 32 to receiver 33 whence it can be drained to storage through barometrically sealed pipe 34, or is directed through pipe 35 to pumping tank 36 wherein it is available for return to the top of column 16, if preferred, by means of pump 37 and reflux line 38 for use in control of the reflux ratio in column 16 during that early part of the fractional distillation when normally liquid materials that boil below naphthalene are being distilled from the crude naphthalene charged into still 10.

During those periods of fractional distillation of naphthalene crudes, according to the present invention, when the forerunnings are solvent-naphtha products that are non-crystalline at ordinary temperatures, these solvent forerunnings can be returned to column 16 for purposes of reflux because they require for the purpose no heat-insulated equipment or pumps operative at high temperatures. This forerunnings material obviously cannot, however, be so employed when in the course of the distillation, the distillate reaches the refined naphthalene stage because such material is miscible with and consequently contaminates the condensed naphthalene product, and its employment at such time would thus defeat the whole purpose of the distillation.

In order that distillation, condensation, and the collecting of distillate fractions can be optionally performed in the illustrated apparatus under varying degrees of vacuum, there is provided steam-jet vacuum pump 39. Interposed between said vacuum pump and the plurality of lines connecting the same with divers features of the apparatus is direct condenser 40 wherein all gases and vapors to be discharged from the apparatus system by said vacuum pump, are subjected to a direct shock cooling with cold water, supplied by pipe 41 and sprayed from its spray nozzle 42, before entering the pump. By reason of this protective shock cooling step, substantially only permanent gases and the vapors of low-boiling liquids ever reach the vacuum pump 39 itself and in consequence it never becomes stopped with deposited condensates which in the case of naphthalene can be exceedingly troublesome. As is clear from the drawing, direct cooler 40, and therefore indirectly also vacuum pump 39, can be connected by means of valved lines 43, 44, 45, 46, and 48 respectively, either severally or collectively, with forerunning-distillate separators 28, 33, with water-tube condenser 21, directly with outlet vapor-line 19 of distillation column 16, with pure products receiving tank 55, and also with intermediates separator-tank 52. Lines 46, 48, with their respective valves 47, 49, also serve optionally to direct condensibles removed in direct cooler 40 either to said pure products tank 55 or to separator-tank 52.

Distillate fractions condenensed in condenser 21 and drained therefrom through insulated pipe 26 can be flowed not only through valved line 27 to separator 28, as above described, but also, by closing the illustrated valve of line 27, through the insulated extension of pipe 26, i. e., line 50, by opening valves 50a and 51, into either intermediates-distillate separator-tank 52, or, by closing the latter said valve 51 and opening valve 53 of insulated pipe 54, can be flowed into pure-products tank 55.

The said intermediates-distillate separator tank 52, that is designed to handle those condensates which have boiling ranges intermediate those of solvent-naphtha fractions and the boiling point of refined naphthalene and which can be heavy slurries and even be highly viscous in consistency, is supplied with a weir 56 over which inflowing condensate passes while being sprayed with cold water delivered through pipe 57, thereby to cool quickly and thicken the naphthalene intermediates and so facilitate their separation from associated water; the said separator-tank is, in addition, supplied with atmospheric vent 52a. Removable baffle plates 58 and 59, that are disposed within the separator-tank and are supported from the top and from the bottom thereof respectively, serve to retain both those substances which either sink to the bottom of said tank or float upon the watery portion as the latter flows toward removable screen 60 that filters out substantially the remainder of the said substances, so that only clear water is drained from the intermediates-distillate separator-tank through manifold 61 and drain pipe 62 to sewer disposal.

The slushy or solid fractions of the distillate-intermediates so-retained in the separating tank are, either during or after completion of a batch distillation, remelted by heat supplied indirectly by steam coil 63 and are thereafter returned to the still kettle 10 through valve-controlled intermediates return line 64 by pump 8 which forces them through the said charging pipe 9 and into the said still kettle 10 for redistillation to separate their naphthalene content. Baffle plates 58, 59, and screen 60 are removably supported in separator 52 so that they can be dispensed with when the characteristics of the oily fraction or fractions of the collected intermediates is such that they can be adequately separated in liquid phase from the aqueous portion without other means than manifold 61 through which said oils can be decanted into pipe 64 by a connecting pipe therebetween and so returned to the still, as described.

The hereinabove-mentioned pure products decanter tank 55 which is vented to atmsophere by pipe 55a is heat insulated and is, in addition, equipped with a steam-heated shell, at its lower portion, to which the purified product settles, thereby to retain the same in liquid state. The settled liquid product is withdrawn from the said decanter tank through insulated siphon pipe 65 and is pumped by pump 66 into products-storage tank 67 that is equipped with steam coil 68 to supply indirect heat to retain said product in liquid phase for the purpose of shipping. Supernatant water, containing a small amount of product, gravitally separates in the said decanter tank 55 and is decanted through pipe 69 to a catch box 70 wherein a water spray 71 can be employed quickly to cool the inflowing water and thereby solidify its entrained naphthalene, or the like, and facilitate retention of the latter behind filter screens 72, that are removable for the purpose of cleaning. The so-filtered water, substantially free of naphthalene, can be safely discarded to sewer through drain pipe 73.

For regulably controlling, according to the principles of the present improvement, the vapor-to-liquid ratios employed in fractionating column 16, there is provided, adjacent the top of the fractionating column, a pipe system for flowing, at preferred accurately adjusted rates, a chosen reflux-producing liquid into the said column and into direct contact with distilling vapors passing upwardly therethrough. For this purpose, valve-controlled pipe 74 communicates with a source of reflux-producing liquid, for example water, that is flowed into the fractionating column at a chosen rate which is carefully controlled by adjustment of a valve 75, such as is shown, for example, in greater detail in Fig. 2, and is of a type especially well suited to provide the required sensitive and accurate flow control. This valve is a so-called micro-thread indicating control valve made by the H. Belfield Company and is equipped with an indicator 76 on the valve stem and a scale 77 whereby accuracy of valve-setting is simplified. The said pipe system is further provided with a rotameter 78 that visually indicates and thus assists in establishment of an adjusted rate of flow of the liquid that thereafter flows through pipe 79 into the fractionating column at the adjusted rate; it can be sprayed by spray nozzles 80, if preferred, thereby to attain an efficient degree of contact with the fractionating vapors.

When operating the hereinabove-described apparatus according to the present improvement for the purpose of producing refined naphthalene from, for example, naphthalene-containing heavy solvent naphtha or crude naphthalene condensed in the final cooler of a coke-oven plant, the said crude material is charged into the batch-still 10 and is fractionally distilled by heating with both direct and indirect steam delivered through pipes 12, 13. The evolved vapors pass into and are fractionated in the column 16, the heavier vapor components tending, at first, to be selectively condensed and returned to the still-kettle whereas the vapors of the lower boiling constituents, for example light solvent naphtha, tend to progress upwardly and eventually leave the top of column 16 and, after traversing vapor-line 19, pass by closed valve 45a and through open valve 20 to be condensed to their liquid phase in tube condenser 21, by indirect contact with cooling water therein, whence they flow through insulated line 26 and are thereafter directed through branch-line 27 into decanting separator 28, and, when freed therein from any aqueous content are subsequently delivered to receiver 33. For reasons of steam economy, it is preferable during this distillation from the charged crudes of still-kettle 10 of those constituents that boil considerably below naphthalene, to carry out the distillation under a relatively high vacuum of for example about 26 inches of mercury, the vacuum being established by steam-jet pump 39 operating through opened valve 44a and pipe 44 whereby said pump communicates with the outlet end of condenser 21.

During that period of fractional distillation of the naphthalene crudes when only those components thereof that distill below the boiling point of naphthalene are passing from the fractionating column 16 to receivers 28, 33, a portion of their condensate can be expediently returned into the fractionating column for the purpose of controlling the liquid-to-vapor ratio maintained therein by introducing such portion by means of proportioning pump 31 into pipe 35 whence it flows into pumping tank 36 and is then forced into the upper part of the column 16 through pipe 38 at a regulable rate.

Upon substantially complete removal of the solvent fraction from the still charge and with the appearance of naphthalene in the vapors effluent the fractionating column, recirculation thereto of solvent-naphtha fractions is discontinued; valve-controlled vacuum-vent line 43, connecting the vacuum apparatus to the solvents separator and receiver, and valve-controlled pipe 27, connecting pipe 26 and the said separator 28, are closed; and the flow of cold water into water-tube condenser 21 is reduced and steam is injected from steam injector pipe 22 into the water recirculated through said condenser thereby to raise the temperature at which condensation takes place to a temperature point preferably just above the melting point of naphthalene.

Naphthalene can now be distilled from the residuum of the still charge with the aid of both direct and indirect steam and, optionally with the aid of vacuum on the distilling zone, but before a naphthalene product of a high degree of refinement is obtainable as a distillate there remains yet to be removed from said residuum the so-called naphthalene intermediates; i. e., those distillate products of the fractional distillation that are a mixture of naphthalene and other components having distilling ranges relatively closer to that of refined naphthalene than have the solvent naphtha.

The present invention provides, during the distillation of said naphthalene intermediates and also of the refined naphthalene distillate product itself, improved and novel means for regulably controlling in the fractionating column the employed ratios between ascending vapors and descending condensate derived therefrom that in greater part determine the volume of distillate into which the intermediates can be concentrated and consequently also the yield of refined naphthalene that can be recovered from the crude charged into the still. According to the present improvement, any preferred proportion of the distilling vapors are condensed in situ in the zone of fractionation to give a preferred ratio between vapors and liquid by introducing directly into the hot vapors of distillation an equivalent proportion of a liquid that is immiscible with the distilled fractions and preferably vaporizes at a lower temperature; for example, water. The immiscible reflux-producing liquid can be simply flowed onto one of the bubble-cap trays or, if preferred, can be sprayed under pressure into the hot vapors without departing from the spirit of the invention and it may also be introduced into the hot vapors at any preferred point in the zone of fractionation; it is however preferred in the present instance to introduce it into the upper part of the fractionating zone.

The so-introduced immiscible liquid is almost immediately volatilized by contact with the hot distilling vapors rising through the fractionating column, thereby condensing an equivalent amount of said vapors which immediately begin to function as reflux liquid for further quantities of distilling vapors; the immiscible liquid is preferably, but not necessarily, introduced into the fractionation zone at rather regular rates of flow that in quantity do not exceed those that are rather promptly volatilizable so as to avoid erratic fluctuations in equilibria that exist in said zone at points below the level or levels of immiscible-liquid introduction. This condensation of distilling vapors by the direct evaporation of a therewith immiscible liquid to produce refluxing liquid provides a simple and accurate means of controlling the volume of produced reflux liquid, and more especially in the case of naphthalene distillation eliminates the necessity and expense of providing, outside the zone of distillation, elaborate condensing and pumping equipment for returning hot liquid naphthalene to the fractionating column; it also reduces to at least about one-sixth that amount of water which is required to produce a given volume of liquid reflux by indirect contact therewith, not to mention the savings in pumping costs and the elimination of fire hazards and of freezing of the said recirculating equipment with solid naphthalene.

The vapors of immiscible liquid, employed for producing liquid reflux in the fractionating zone, pass from the fractionating column in admixture with distillate product removed from the charge of crude material and flow with it into condenser 21 where they are condensed in the presence of each other.

During that above-mentioned period of distillation in the illustrated apparatus when naphthalene intermediates are being distilled from the portion of the still charge remaining in the still-kettle, the distillate product is a mixture of naphthalene and of high-boiling oils, and the like, having a relatively low melting point and the both of these are admixed with vaporized reflux-producing liquid (in this instance water vapor) that is continuously flowed into the hot vapors adjacent the top of column 16, as above-described; the said vaporous mixture, after traversing condenser 21 and being there condensed preferably to a liquid mixture, flows through insulated pipe 50 (valves 50a and 51 being in opened and valve 53 in closed position) into intermediates-separator tank 52. While flowing over weir 56 thereof, the said liquid mixture is preferably shock cooled by cold water spray delivered through the spray-nozzle of pipe 57; this shock-cooling step tends to crystallize such naphthalene as is solidifiable from the distillate mixture and, depending upon the characteristics of the naphthalene crude charged into the still-kettle and also upon whether the distillate is a portion representing the early or the later portions of the naphthalene-intermediates fraction, the said shock-cooling step will normally divide the distillate mixture into fractions that either float or sink in the associated aqueous portion, and inasmuch as the crystals of any so-produced solidified naphthalene product are uniformly small, the associated aqueous portion is easily separated from the whole of the naphthalene-intermediates fraction by proper manipulation of the valves of manifold 61, and discharged to waste through pipe 62. Following separation of said aqueous portion, the intermediates can be melted in separator 52 and returned to still 10 for reworking to recover additional amounts of their naphthalene content in the form of refined solid naphthalene, as hereinabove described.

When, in the course of the distillation process and while continuing to produce reflux liquid in the fractionation column by introduction of liquid water thereinto, the non-aqueous portion of the vapors issuing from the said column show upon condensation that they are a naphthalene product having a melting point of not less than about 74° C., valves 49 and 51 are closed and valves 47 and 53 are opened, thereby directing this refined naphthalene distillate into coil-heated pure-products receiver 55 where it is collected in melted state.

An important feature of the present improved method for refining naphthalene crudes by their fractional distillation is the employment of the unanticipated discovery that a naphthalene distillate product having a melting point of at least about 74° C. (that is, containing still a small proportion of impurities of lower specific gravity) has in its molten state a specific gravity sufficiently greater than has water at the same temperature that it sinks therein and that a substantially water-free naphthalene product can be separated from a liquid mixture of the two by the simple expedient of withdrawing the settled liquid naphthalene from beneath the supernatant layer of water. This novel possibility contributes significantly to the smooth continuous working of the present process system and eliminates any necessity for an elaborate system of crystallizing pans or other means for subsequently separating into its components the aqueous naphthalene mixture flowing from the still. Moreover, it has been in the trade more recently customary to ship, especially to plants for catalytically converting naphthalene into other products, large quantities of naphthalene in molten condition in insulated tank cars; thus, manifestly, the discovery that a distilled naphthalene product having a melting point of not substantially less than about 74° C.—a product that is sufficiently refined to be used directly in most catalytic processes—can be settled from and recovered substantially free of water from a mixture of the two, makes it possible to load such liquid naphthalene distillate directly from the condenser into tank cars for shipment, thereby avoiding the expense of providing at this point in the process any additional means, for example, separators, or crystallizers, or re-melting tanks, to prepare the naphthalene product for commercial distribution. In addition, in pure-products receiver 55, the lower layer of hot molten naphthalene can be always kept covered with a protective, blanketing layer of supernatant water that prevents its loss to the atmosphere or its creating a nuisance in adjacent surroundings by sublimation.

In the preferred operation of the process, the refined naphthalene is condensed in condenser 21 only to its liquid form and is thereafter flowed through lines 26, 50, and 53 into said pure-products tank 55 whence, after settling from its associated water, it is withdrawn still in liquid condition into storage tank 67 therefor by means of a pump 66. Condensation, under conditions of vacuum and at an elevated temperature, for example, above the melting point of naphthalene, of those distilled fractions having relatively high contents of naphthalene, leaves in the vapors and any permanent gases flowing from condenser 21 through lines 44, 45, toward vacuum-pump 39 a high concentration of naphthalene vapor which if it reaches the vacuum-pump is either discharged into the atmosphere, and consequently lost, or is deposited in said pump and renders it inoperative to produce the required vacuum conditions. According to the present improvement, therefore, to obviate these disadvantages and to make feasible in large scale practice the vacuum distillation and condensation, at elevated temperatures, of naphthalene, and the like materials, there is placed in the piping connection connecting the vacuum pump with the condensing space a shock-cooling condenser 40 wherein the mixture of vapors and permanent gases, issuing from the condenser space of apparatus 21, are brought into direct contact with a spray of cold water delivered through pipe 41 to spray nozzle 42. By this means, the hot gases and vapors are chilled and washed before they reach the vacuum-pump and any troublesome naphthalene content is precipitated into the descending water-spray which washes the so-precipitated solids out of the condensing space of said member 40 into drain pipe 46 at the bottom thereof and flushes them, in the case they are derived from the naphthalene intermediates into intermediates-separator 52 or into pure-products receiver 55 in the event they have their origin in the refined naphthalene vapors. Thus, not only are the naphthalene vapors that issue from indirect condenser 21 simply recovered in directly usable form but also the vacuum-pump is assured of uninterrupted and extended operation to supply for the fractional distillation the required conditions of vacuum in the apparatus assembly.

Determinative of the degree of vacuum under which the fractional distillation can be conducted in fractionating column 16 is the temperature of condensation of the mixture of naphthalene and of water vapors issuing therefrom. When the said temperature of condensation in indirect condenser 21 is such as there to convert most of the distilled naphthalene vapors to a liquid product, as above described, the maximum degree of vacuum producible in the fractionating column is about 11 inches of mercury. This is in consequence of the relatively high pressure of the water-vapor component of the distilled vapors at temperatures above the melting point of naphthalene. Gradually increasing the degree of vacuum obtaining in the fractionating column above the stated figure and at the same time maintaining a temperature in indirect condenser 21 that is appropriate to produce a liquid naphthalene therein causes increasing proportions of the naphthalene vapors to be carried into direct cooler 40 there to be recovered in crystalline form. Eventually, when the vacuum established in the fractionating column reaches the order of about 16 inches of mercury, no more liquid naphthalene will be produced in the said indirect condenser, and it will be totally converted into crystalline form in the direct shock-cooler 40. Thus, the illustrated apparatus system is operative by variation of the degree of vacuum established therein by vacuum-pump 39 directly to convert the distilled naphthalene vapors optionally substantially completely either to liquid or to crystalline naphthalene, or to any preferred distribution thereof between these two forms of product and, moreover, to effect such result without loss or stoppage of the vacuum-pump. Obviously, at such times as it is preferred to produce only crystalline product, indirect condenser 21 can be by-passed by closing valves 20 and 44a and all the vapors of distillation are then directed through open valve 45a and pipe 45 directly into direct cooler 40. The crystalline naphthalene product can be separated from the cooling water in pure-products separator 55 which will be no longer heated.

A convenient method of recharging still-kettle 10 with new quantities of crude to be treated, and of returning the naphthalene intermediates collected in separator 52 to the still for reworking, is to introduce the former material into separator 52 and under the influence of heat to dissolve the one material in the other and to flow the resultant mixture by means of pipe 64 and pump 8 into said still 10; such practice advantageously tends to form a single layer of material in said separator 52 and thus facilitates separation of the oily and aqueous fractions therein.

In plant operation, it has been found that when the above-described novel process of vacuum distillation of naphthalene is operated to produce only liquid naphthalene condensate, i. e., when employing a vacuum of approximately 11 inches of mercury, about thirty per cent saving in the cost of steam results; when only crystalline naphthalene is produced, i. e., when employing a vacuum of approximately 26 inches of mercury during the distillation, there is obtained a seventy-five per cent saving in steam costs and carrier or sweep-steam is no longer required. That novel feature of the above-described process for producing reflux liquid in the fractionating column can of course be realized whether distillation is conducted at normal or reduced pressures, and the process as a whole lends itself to cyclic operation.

When treating ordinary final-cooler naphthalene such as is produced in coke-oven plants, a sixty-five per cent yield of naphthalene having a melting point of 78° C. is obtained by a single distillation; reworking of the naphthalene intermediates converts substantially the whole of such final-cooler naphthalene to such refined product.

Although in the above-given example of the operation of the instant novel process naphthalene has been employed as the specific material being treated and water used as the reflux-producing liquid, it is not intended that the features of invention be limited exclusively thereto because a diversity of crude materials and appropriate reflux-producing liquids therefor can be similarly refined and employed without departing from the spirit and intent of the inventive thought.

The invention as hereinabove set forth is embodied in particular form and manner but may be variously embodied within the scope of the claims hereinafter made.

I claim:

1. A process for fractionally distilling a naphthalene crude and recovering a naphthalene distillate therefrom, said process comprising, the steps of: in the zone of fractional distillation, bringing naphthalene vapors of distillation into countercurrent contact with reflux liquid naphthalene condensate derived from said naphthalene vapors to produce a naphthalene distillate product having a melting point between 74° C. and 78° C., effecting the condensation of the said reflux condensate at least in part by introducing into direct contact with, and thereafter evaporating by the heat of, distilling naphthalene vapors in said fractionating zone of a liquid that is substantially immiscible with said naphthalene distillate when their vapors are condensed in the presence of each other; flowing refined naphthalene vapors of melting point aforesaid from said zone of fractional distillation into a cooling system comprising at least two cooling steps for said vapors; separating from said refined naphthalene vapors in a prior cooling step liquid condensate of naphthalene; in a subsequent cooling step separating from vapors and gases effluent to said prior cooling step a crystalline condensate of naphthalene by direct contact with a cooling liquid that is substantially immiscible with crystalline naphthalene; and flushing said crystalline naphthalene from the apparatus of said latter subsequent cooling step by means including the said immiscible cooling liquid employed therein.

2. A process for fractionally distilling a naphthalene crude and recovering a naphthalene distillate therefrom at less than atmospheric pressure, said process comprising, the steps of: in the zone of fractional distillation, bringing naphthalene vapors of distillation into countercurrent contact with reflux liquid naphthalene condensate derived from said vapors to produce a naphthalene distillate product having a melting point between 74° C. an 78° C., effecting the condensation of said reflux condensate at least in part by introducing into direct contact with, and thereafter evaporating by the heat of, distilling naphthalene vapors in said fractionating zone of liquid water that is substantially immiscible with said naphthalene distillate when their vapors are condensed in the presence of each other; flowing refined naphthalene vapors of melting point aforesaid from said zone of fractional distillation into a cooling system comprising at least two cooling steps for said vapors; separating from said refined naphthalene vapors in a prior cooling step liquid condensate of naphthalene; in a subsequent cooling step separating from vapors and gases effluent to said prior cooling step a crystalline condensate of naphthalene by direct contact with cooling liquid water that is substantially immiscible with crystalline naphthalene and flushing said crystalline naphthalene from the apparatus of said subsequent cooling step by means including the immiscible cooling liquid water employed therein; the said cooling steps being both disposed between the zone of fractional distillation and means for providing therein the said less than atmospheric pressure.

3. A process of recovering a distillate of naphthalene by fractional distillation of a crude thereof, said process comprising, in the zone of distillation, bringing naphthalene vapors of distillation into counter-current contact with reflux liquid naphthalene condensate having a melting point of at least about 74° C. and derived from said naphthalene vapors, effecting the condensation of said condensate at least in part by introducing into direct contact with, and thereafter evaporating by the heat of condensation of distilling naphthalene vapors in said fractionating zone having a melting point of at least about 74° C., of a liquid that is substantially immiscible with said naphthalene distillate upon subsequent condensation of their vapors in the presence of each other, the immiscible liquid being introduced into the fractionating zone in a quantity not to exceed that which is promptly volatilizable, thereby to avoid erratic fluctuations in equilibria that exist in the zone of naphthalene fractionation at levels below the level of liquid introduction and flash crystallization of naphthalene in said fractionating zone.

4. A process of recovering a distillate of naphthalene by fractional distillation of a crude thereof, said process comprising, in the zone of distillation, bringing naphthalene vapors of distillation into counter-current contact with reflux liquid naphthalene condensate derived from said naphthalene vapors, effecting the condensation of said condensate at least in part by introducing into direct contact with, and thereafter evaporating by condensation of distilling naphthalene vapors in said fractionating zone of liquid water that has a lower boiling point and is substantially immiscible with said naphthalene distillate upon subsequent condensation of their vapors in the presence of each other, to produce the required amount of reflux liquid naphthalene condensate, and flowing naphthalene distillate aforesaid in vapor form into a condensation zone along with the reflux producing water vapor and condensing the both said vapors in the presence of each other to their liquid phases.

5. A process of recovering a distillate of naphthalene by fractional distillation of a crude thereof, said process comprising, in the zone of fractional distillation, bringing naphthalene vapors of distillation into countercurrent contact with reflux liquid naphthalene condensate derived from said naphthalene vapors, effecting the condensation of said reflux condensate at least in part by introducing liquid water into direct contact with distilling naphthalene vapors in said zone of fractional distillation and evaporating such water by heat absorbed in condensation of an amount of said distilling vapors sufficient to produce the required amount of reflux liquid naphthalene condensate to produce the required amount of reflux liquid naphthalene condensate, and in a subsequent cooling step separating from vapors and gases effluent to said fractionating zone a crystalline condensate of naphthalene by direct contact with cooling liquid water that is substantially immiscible with crystalline naphthalene, and flushing said crystalline naphthalene from the apparatus of said subsequent cooling step by means including the immiscible cooling liquid water employed therein.

6. A process for recovering a distillate of naphthalene by fractional distillation of a crude thereof that is free of forerunnings and intermediates, said process comprising: in the zone of fractional distillation, bringing vapors of distillation of a crude aforesaid into countercurrent contact with reflux liquid-condensate derived from said vapors and thereby producing a naphthalene distillate having a melting point of as high as at least about 74° C.; introducing liquid water into direct contact with vapors of distillation in said zone of fractional distillation and evaporating said water by condensation of distilling naphthalene vapors in situ in said distillation zone thereby to convert the latter into the aforesaid refluxing liquid; condensing vapors of the refluxed distilling naphthalene and so-evaporated reflux producing water in the presence of each other into their liquid phases outside said zone of fractional distillation; and thereafter separating the latter condensed naphthalene distillate and water from each other while they are in their liquid phases.

7. A process for recovering a distillate of naphthalene by fractional distillation of a crude thereof that is free of forerunnings and intermediates, said process comprising: in the zone of fractional distillation, bringing vapors of distillation of a crude aforesaid into countercurrent contact with reflux liquid-condensate derived from said vapors and thereby producing a naphthalene distillate having a melting point of as high as at least about 74° C.; introducing liquid water into direct contact with vapors of distillation in said zone of fractional distillation and evaporating said water by condensation of distilling naphthalene vapors in situ in said distillation zone thereby to convert the latter into the aforesaid refluxing liquid; flowing refined naphthalene distillate aforesaid in vapor form into a condensation zone along with the reflux-producing water vapor and condensing the both said vapors in the presence of each other to their liquid phases; segregating from said condensate in liquid phase beneath a supernatant layer of the condensed reflux-producing water as the refined naphthalene distillate product having a melting point of as high as at least about 74° C. by gravital separation of the two; and thereafter removing in liquid phase the gravitally separated naphthalene as substantially water-free naphthalene from beneath said supernatant water layer.

8. A process for recovering a distillate of naphthalene by fractional distillation of a crude thereof, said process comprising: in the zone of fractional distillation, bringing naphthalene vapors of distillation of a crude aforesaid into countercurrent contact with reflux liquid-condensate derived from said vapors and thereby producing naphthalene distillate vapors; introducing liquid water into direct contact with vapors of distillation in said zone of fractional distillation and evaporating said water by condensation of distilling naphthalene vapors in situ in said distillation zone thereby to convert the latter into the aforesaid refluxing liquid; flowing the vapors effluent from the reflux step from said zone of fractional distillation through a cooling system comprising at least two cooling steps for said vapors outside said zone of fractional distillation; condensing vapors of the refluxed distilling naphthalene and the evaporated reflux producing water in the presence of each other into their liquid phases in a prior cooling step of said cooling system; and in a subsequent step of said cooling system separating from vapors and gases effluent to said prior cooling step a crystalline condensate of naphthalene by direct contact with cooling liquid water that is substantially immiscible with crystalline naphthalene; and flushing said crystalline naphthalene from the apparatus of said cooling step by means including the immiscible cooling liquid water employed therein.

9. A process as claimed in claim 5, and in which the fractional distillation zone for the naphthalene and the cooling step for the vapors therefrom are maintained under vacuum during both the fractional distillation and the cooling of the naphthalene.

10. A process as claimed in claim 4, and in which the fractional distillation zone for the naphthalene and the condensation step for the vapors therefrom are maintained under vacuum during both the fractional distillation and the condensation of the naphthalene.

11. A process as claimed in claim 8 and in which the fractional distillation zone and the two cooling steps for the naphthalene vapors therefrom are maintained under vacuum during both the fractional distillation and the cooling of the naphthalene.

BERNARD J. C. VAN DER HOEVEN.

REFERENCES CITED

The following references are of record in the file of this patent:

UNITED STATES PATENTS

| Number | Name | Date |
|---|---|---|
| 306,832 | Houghton | Oct. 21, 1884 |
| 1,561,899 | Barbet | Nov. 17, 1925 |
| 1,591,428 | Matlock | July 6, 1926 |
| 1,615,991 | Mason | Feb. 1, 1927 |
| 1,711,351 | Isom | Apr. 30, 1929 |
| 1,719,431 | Kaiser | July 2, 1929 |
| 1,986,165 | Sieck | Jan. 1, 1935 |
| 2,261,939 | Morlock | Nov. 11, 1941 |
| 2,290,073 | Lee | July 21, 1942 |

FOREIGN PATENTS

| Number | Country | Date |
|---|---|---|
| 408,117 | Great Britain | Apr. 5, 1934 |